May 6, 1924.
O. AMMANN
1,493,225
GUNNERY CHART
Filed July 7, 1920    2 Sheets-Sheet 1
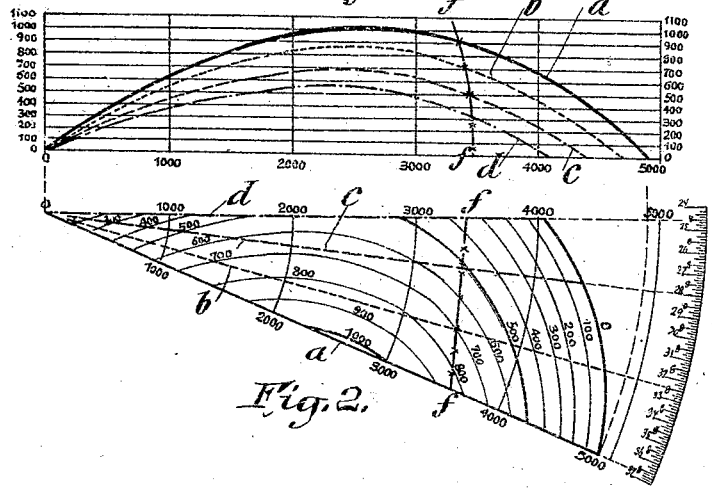
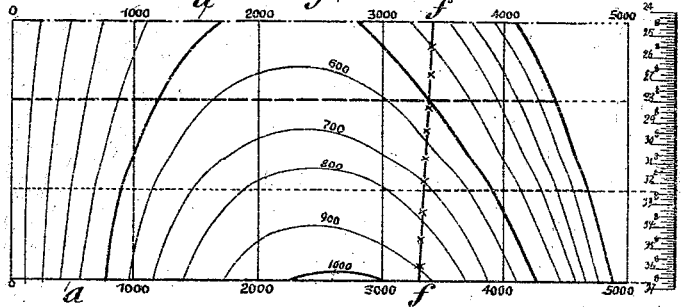
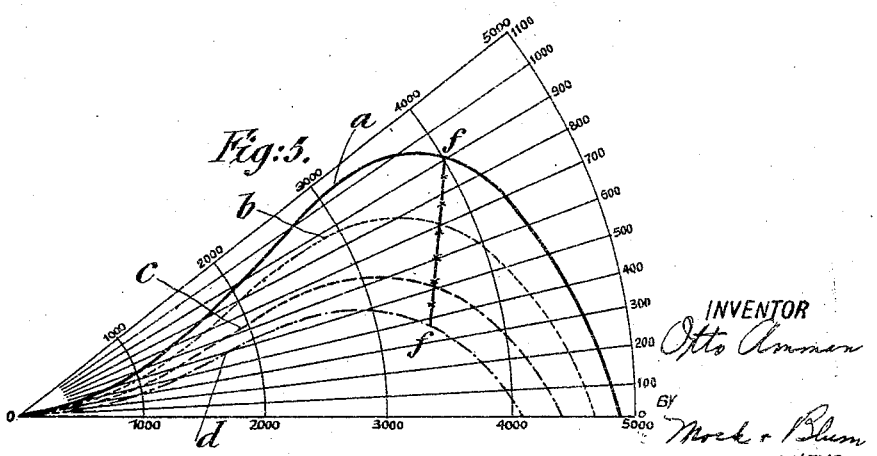
INVENTOR
Otto Ammann
BY
Mock & Blum
ATTORNEYS.

May 6, 1924.

O. AMMANN

GUNNERY CHART

Filed July 7, 1920

Patented May 6, 1924.

1,493,225

UNITED STATES PATENT OFFICE.

OTTO AMMANN, OF KARLSRUHE, GERMANY.

GUNNERY CHART.

Application filed July 7, 1920. Serial No. 394,602.

*To all whom it may concern:*

Be it known that I, OTTO AMMANN, a citizen of the German Republic, residing at Karlsruhe, Bunscustr. 6, Baden, Germany, have invented certain new and useful Improvements in Gunnery Charts, of which the following is a specification.

My invention relates to gunnery charts. Such charts have been suggested for finding out the quantities of values important for shooting with cannon, mine-projectors and the like. These former devices however, only disclosed the values required for the targets lying in the same level as the gun. For other levels all the necessary values had to be calculated in a difficult and complicated manner, so that accurate shooting in mountains was very difficult.

In the use of these previously known charts, it was necessary to make interpolations by means of the unaided eye which led to inaccuracy.

The object of my invention is to produce new gunnery charts for quickly and easily disclosing the required barrel-inclination and trajectory without any calculations for all targets within the range of the gun, whether the target is above or below the gun and for disclosing all required values (burning time, side-shifting, etc). A further object of my invention is to enable the use of graphs or curves representing the same barrel-inclination, burning-time, side-shifting, etc. A device combinating both said features may be constructed according to my invention.

According to my invention, the various trajectories corresponding to a change in one of the values, as for instance, the trajectories corresponding to various inclinations or elevations, are represented in a horizontal plane by a series of lines having a definite relation with each other, these lines being represented either in polar or rectangular coordinates, while the lines representing other quantities or values which must be known for aiming the gun are so drawn so as to intersect the first-mentioned lines, whereby the intersections of these two systems of lines give the data desired. A scale is also provided so as to enable accurate interpolations to find out whether this is necessary.

Some of the embodiments of my invention are set forth in the following description and drawings:—

Fig. 1 is a conventional representation of the trajectories corresponding to different elevations of the gun barrel and also shows the graphical representation of some of the data necessary for loading the gun.

Fig. 2 shows the graphical representation of this data in polar coordinates, according to my invention.

Fig. 3 shows the graphical representation of Fig. 2 in rectangular coordinates.

Fig. 4 is a side view of a scale used for determining the angle of fall of the various trajectories, at the various points thereof.

Fig. 5 shows a chart in which the graphs are differently plotted.

Figure 6:
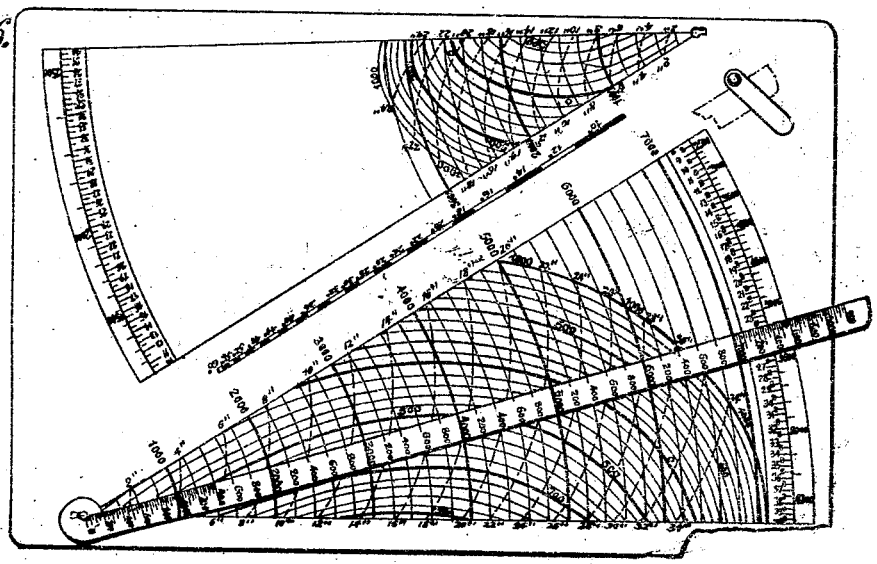
Fig. 6 is a modification of Fig. 1 showing how the principle of Fig. 1 can be used for determining additional data.

In Fig. 1, which is in rectangular coordinates, the horizontal distance from the origin "0" represents the horizontal distance from the location of the gun, and the vertical distance from the origin represents the elevation of the path of the projectile.

The four trajectories $a$, $b$, $c$, and $d$ represent the paths taken by the projectile for different elevations of the gun, the other quantities remaining the same.

The line $f$—$f$ in Fig. 1 represents a series of points whose location graphically represents some value connected with the firing of the projectile. For example, the line $f$—$f$ may be used to represent points relating to the same time of flight, the same side shifting, etc.

In Fig. 2, the four trajectories $a$, $b$, $c$, and $d$ are represented by four straight lines radiating from a common origin 0 and separated by angles equal to the difference between the angles of elevation used for producing the trajectories shown in Fig. 1. In this case, the difference of elevation is substantially the same throughout as is indicated upon the scale of angles shown at the right hand side of Fig. 2.

The horizontal distance from the location of the gun is represented by a series of circular arcs, having the origin 0 as their common center, and it can be readily seen that in this particular instance, the radius of each arc in Fig. 2 is equal to the distance of the corresponding vertical line from the origin 0. Hence the four rays shown in Fig. 2 may be considered as the horizontal projections of the four arcs representing the trajectories in Fig. 1.

As can be seen in Fig. 1, the point at which a shell or the like is at a given height is indicated by the intersection of the arc representing its trajectory with the horizontal line corresponding to said height. This intersection is depicted on the corresponding ray in Fig. 2 by laying off on that ray a distance equal to the abscissa of said point in Fig. 1. The curves connecting said points in Fig. 2 may be called contour lines or level lines, and the heights which they designate are indicated as 0 meters, 100 meters, etc., as shown in Fig. 2.

The line $f$—$f$ is plotted so as to indicate the same data shown in Fig. 1. It can be readily seen that if it is desired to know the condition which would exist with respect to any given trajectory for a given elevation, that this may be determined in the chart shown in Fig. 2, by drawing a line from the origin 0 to that point on the scale of angles, which would correspond to the elevation of the trajectory which is desired to be studied, and that this trajectory can be indicated by suitably holding a ruler or any other device having a straight edge so that interpolations can be quickly and accurately accomplished.

In Fig. 3, the data shown in Fig. 1 are plotted, in a manner analogous to that of Fig. 2, but rectangular coordinates are now used. If a ruler is used for interpolation purposes in Fig. 2 or in Fig. 3, then this ruler is preferably provided with graduations, these graduations corresponding to the distance from the origin of the vertical lines in Fig. 1, so that to this extent, the charts are simplified. The scale in Fig. 4 indicates the inclination of the various trajectories at different heights. The distance between two adjacent contour lines measured on a ray in Fig. 2, if referred to Fig. 4, shows the inclination of the corresponding trajectory at said height. If said distance for example corresponds to the distance marked 14° in Fig. 4, then the inclination of the trajectory is 14°.

It is obvious that instead of using straight lines to indicate the trajectories, that lines or curves of any desired contour can be used to plot out abnormal trajectories.

In Fig. 5, the level lines are indicated by a series of lines radiating from the origin 0, the scale at the right being for the elevations of the respective lines. The trajectories $a$, $b$, $c$, $d$ are then plotted as curves as shown in Fig. 5, and the line $f$—$f$ is plotted as before indicated.

It will be noted that Fig. 6 shows a scale of angles and a scale of elevations at the right thereof.

In addition to this, it can be readily determined whether obstacles between the location of the gun and the target can be shot over as this can be readily determined from an inspection of the chart. In addition the dotted lines of Fig. 6 enable the determination of those points of the trajectories corresponding to equal times of flight.

Fig. 6 is also provided with a scale similar to that shown in Fig. 4, for determining the angle of rise or fall of the trajectory at any point in its path. This is done by comparing the distance of the point corresponding to the target along the revoluble ruler with the distance of the point in the same trajectory located 100 m. higher, in the scale indicating this angle.

It will be noted that the chart shown in Fig. 6 can be used for targets which are below the gun as well as targets which are above the gun.

The chart shown in Fig. 6 thus permits the user to quickly determine the following data:—

1. The coordinates of the trajectory for each charge and barrel inclination. This can be shown by simply determining the points of intersection of the edge of the ruler which indicates the trajectory in question, with the level lines indicated on the chart.

2. The proper charge and barrel inclination for shooting at any target, the horizontal distance of the target from the gun as well as its vertical distance above or below the gun being given by finding out the point of intersection between that part of the ruler which corresponds to the horizontal distance from the original 0, with the proper level line.

One of the advantages of my improved charts is that if a map of the locality at which it is desired to fire is suitably drawn, then all points that may be reached can be readily indicated.

For example, in the embodiment illustrated in Fig. 5, a chart such as is shown there is made upon a board of strong transparent material. A map of the locality forming the zone of fire is then drawn to the same scale, the heights of the various places on said map being suitably indicated. For example contour lines connecting points of equal height may be drawn upon said map.

The origin of said chart is now brought into coincidence with the proposed gun position by means of a pin which is driven through chart and map so that the chart can be revolved about said pin as a pivot. As the chart is revolved the positions in which the various points on the trajectories indicated thereon coincide with points on the map of the same height, can be indicated by piercing the chart and map. Hence lines can be drawn upon the map by connecting points indicating the same distance and height and each of these lines will indicate the points that can be hit with a given trajectory. Other data graphically indicated on said charts can be similarly transferred.

In using the embodiment shown in Fig. 3, substantially the same method is followed. The map of the locality forming the zone of fire is made, with the heights of the various points indicated thereon. This map may be drawn upon any suitable transparent material. A chart according to Fig. 3 is now prepared according to the same scale and if desired the parallel rays representing the various trajectories may be drawn one degree apart so as to obviate any substantial need for interpolation. The position of the gun on the map is now drawn to coincide with the ray designating the same level as the said gun position and the points are marked off as before mentioned.

Having now clearly described my invention and in what manner the same is to be used, what I claim is:

1. A gunnery chart, containing the representations of a series of trajectories corresponding to various inclinations of the gun barrel, and plotted in polar coordinates, each trajectory being represented by a straight line, and auxiliary means for determining data relative to the said trajectories.

2. A gunnery chart, containing the representations of a series of trajectories corresponding to various inclinations of the gun barrel, and plotted in polar coordinates, each trajectory being plotted in a straight line, and auxiliary means for determining data relative to the said trajectories, said means including a graph which indicates upon the chart various points of like significance with respect to the said trajectories.

3. In combination, a gunnery chart having a series of lines indicating levels with respect to the position of the said gun drawn thereon, and a member movable thereon, the said member having a scale indicated thereon, the said chart having another scale along which said member moves, the graphs of the chart and the scale of the said movable member being in such relation that the scale on the said movable member indicates the horizontal distance from the gun, and the position of the first mentioned scale of said movable member on the second mentioned scale indicates the inclination of the gun barrel corresponding to the trajectory along which the projectile fired from the gun will reach a horizontal distance from the gun indicated on the said movable member and be at a height indicated by the intersection of point of the first mentioned scale of said member which corresponds to said horizontal distance, with one of the said lines indicating levels.

4. In combination, a gunnery chart having a series of lines indicating levels with respect to the position of the said gun drawn thereon, and a member movable thereon, the said member having a scale indicated thereon, the said chart having another scale along which said member moves, the graphs of the chart and the scale of the said movable member being in such relation that the scale on the said movable member indicates the horizontal distance from the gun, and the position of the edge of said member on the second mentioned scale indicates the inclination of the gun barrel corresponding to the trajectory along which the projectile fired from the gun will reach a horizontal distance from the gun indicated on the said movable member, the said chart having graphs indicating like points with respect to the positions of said movable member.

5. A gunnery chart having the levels above and below the position of the gun illustrated by a series of graphs, and the inclination of the gun barrel corresponding to a certain trajectory indicated by a straight line, the distance along which indicate the horizontal distances from the location of the gun, whereby interpolations for various trajectories can be accomplished by various positions of the straight line.

OTTO AMMANN.